US009377619B2

(12) United States Patent
Henderson et al.

(10) Patent No.: US 9,377,619 B2
(45) Date of Patent: Jun. 28, 2016

(54) COMPACT WIDE-ANGLE OPTICAL BEAM STEERING ASSEMBLIES AND METHODS THEREOF

(71) Applicant: New Scale Technologies, Inc., Victor, NY (US)

(72) Inventors: David A. Henderson, Farmington, NY (US); Matthew R. Wrona, Fairport, NY (US)

(73) Assignee: New Scale Technologies, Inc., Victor, NY (US)

( * ) Notice: Subject to any disclaimer, the term of this patent is extended or adjusted under 35 U.S.C. 154(b) by 185 days.

(21) Appl. No.: 14/171,374

(22) Filed: Feb. 3, 2014

(65) Prior Publication Data

US 2015/0219892 A1 Aug. 6, 2015

(51) Int. Cl.
*G02B 26/08* (2006.01)
*G02B 26/10* (2006.01)

(52) U.S. Cl.
CPC ............ *G02B 26/101* (2013.01); *G02B 26/105* (2013.01)

(58) Field of Classification Search
CPC ............... G02B 26/085; G02B 26/101; G02B 26/0833; G02B 7/1821; G02B 26/105
USPC ...................... 359/201.1–202.1, 196.1–215.1, 359/220.1–226.2
See application file for complete search history.

(56) References Cited

U.S. PATENT DOCUMENTS

| | | | |
|---|---|---|---|
| 3,622,232 A | 11/1971 | Munnerlyn | |
| 3,892,475 A | 7/1975 | Bardocz | |
| 5,504,630 A | 4/1996 | Hansen | |
| 5,742,042 A * | 4/1998 | Scofield | G06K 7/10653 235/462.36 |
| 5,948,291 A | 9/1999 | Neylan et al. | |
| 7,309,943 B2 | 12/2007 | Henderson et al. | |
| 7,786,648 B2 | 8/2010 | Xu et al. | |
| 8,299,733 B2 | 10/2012 | Sattler et al. | |
| 8,304,960 B2 | 11/2012 | Sattler et al. | |
| 8,450,905 B2 | 5/2013 | Guidarelli et al. | |
| 8,466,637 B2 | 6/2013 | Guidarelli et al. | |
| 2003/0035188 A1 * | 2/2003 | Tominaga | G01S 7/4811 359/224.1 |
| 2010/0289381 A1 | 11/2010 | Xu et al. | |

* cited by examiner

*Primary Examiner* — James Phan
(74) *Attorney, Agent, or Firm* — LeClairRyan, a Professional Corporation

(57) ABSTRACT

A compact wide-angle optical beam steering device includes a first rotor with a first mirror surface and a second rotor with a second mirror surface. The rotors are arranged to rotate about an axis in response to frictionally coupled vibration motors. Drive circuits are coupled to the vibration motors and a control device is coupled to the drive circuits. The control device is configured to execute programmed instructions comprising generating and providing one or more driving signals to the vibration motors to drive the rotors to an angular position about the axes. A light source is positioned to emit a beam directed to the first mirror surface. The beam is reflected from the first mirror and contacts the second mirror. The second mirror is positioned to reflect the beam to exit the steering device at a pointing direction determined by the angular position of the mirrors.

22 Claims, 12 Drawing Sheets

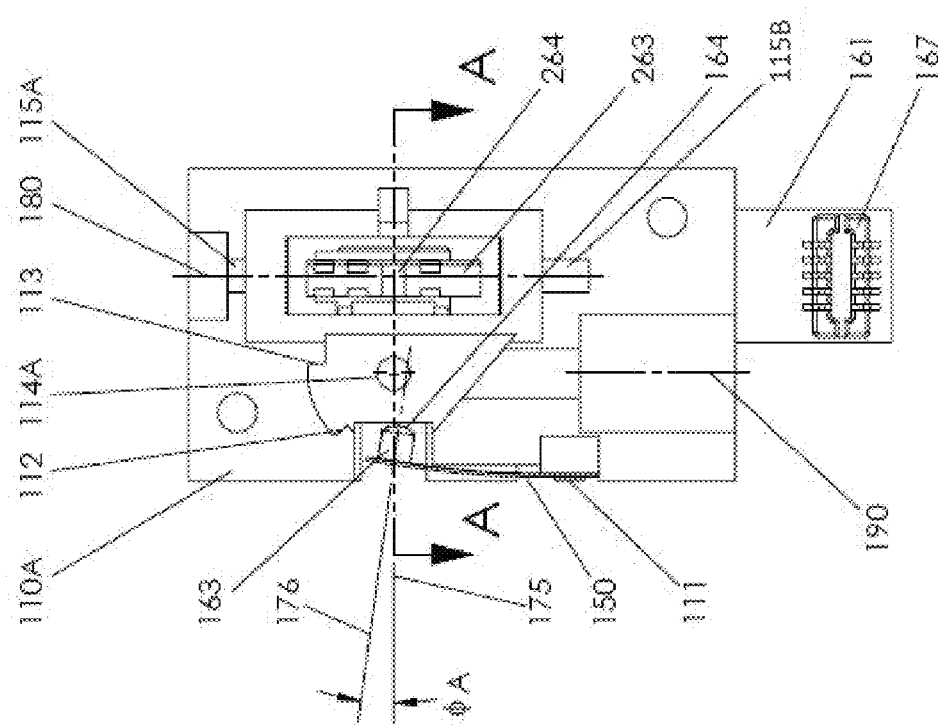

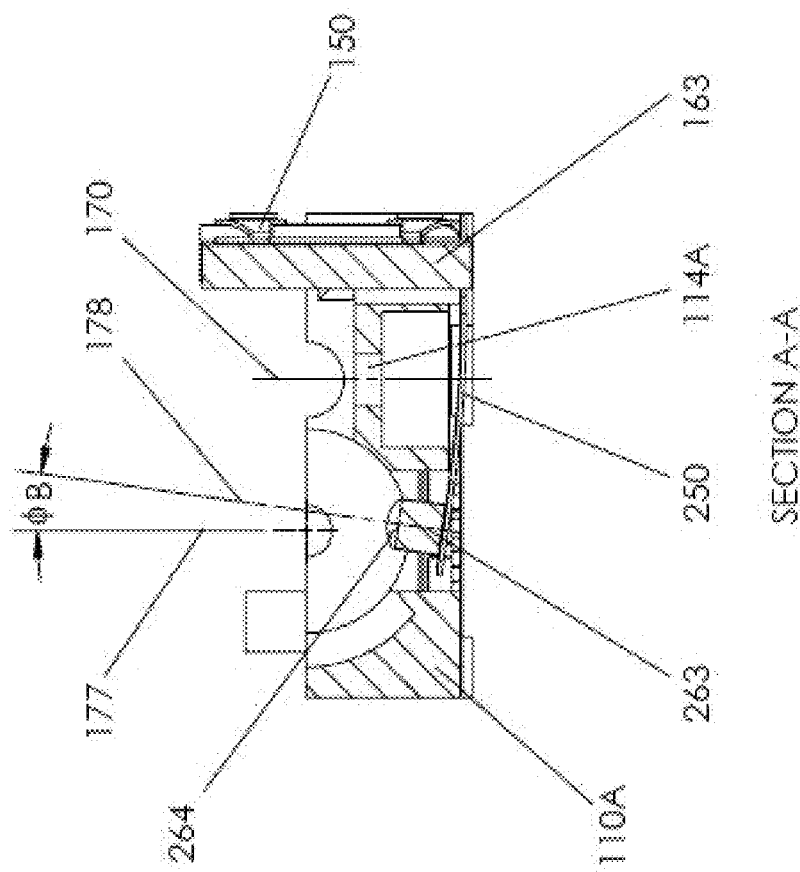

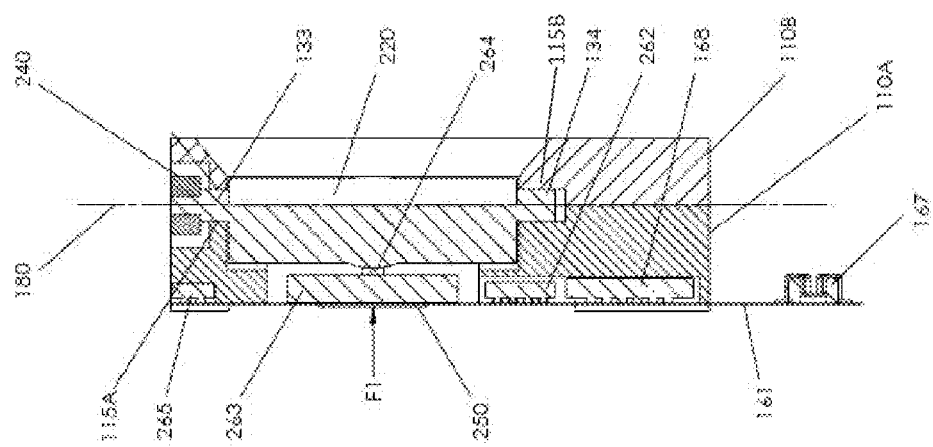

COMPACT WIDE-ANGLE OPTICAL BEAM STEERING ASSEMBLIES AND METHODS THEREOF

FIELD

This technology relates to a compact wide-angle optical beam steering assembly and more particularly to a compact wide-angle optical beam steering assembly that includes highly miniaturized piezoelectric positioning assemblies that rotate mirrors to steer the path of a beam of light, such as a collimated laser beam.

BACKGROUND

Optical scanning or laser scanning describes the controlled pointing (steering) of a light path or laser beam with at least one axis of motion. Two-axis scanning assemblies enable a laser beam to be projected onto a large two dimensional plane with very fast response times related to motion along the axes. Assemblies that steer laser beams may be used in a wide array of industries including additive manufacturing, material processing, laser engraving, optometry, cosmetology, confocal microscopy, laser shows, computer games, LIDAR, barcode scanners, and measuring three dimensional objects for a wide variety of applications.

Laser scanners using galvanometers to rotate mirrors are often utilized to provide such two-axis scanning assemblies. While galvanometer scanners are readily available commercially, galvanometer scanners are generally large assemblies that require high-power electronics with significant heat sinking capabilities. One commercial example of a galvanometer scanner provides a two-axis orthogonal mirror scanner. The scanner accepts up to a 5 mm diameter laser beam and has a range of motion of +/−12.5 degrees. The motor and mirror scanning head is 61×61×36 mm and the separate drive and control electronics are 85×74×84 mm, such that the total volume of the scanner system is nearly 600 cubic centimeters. Such a scanner is too large for many applications and requires high power electronics.

Recent advancements in MEMS technology have demonstrated optical scanning mirrors that are significantly smaller than galvanometer scanners. These scanners, however, still require separate, and relatively large, electronics to provide voltage driving signals that are many hundreds of volts. Thus, these scanners, in view of the size of the electronics required and the amount of power consumed, are also limited with respect to the applications to which they may be applied.

SUMMARY

A compact wide-angle optical beam steering device includes a first rotor with a first mirror surface and a second rotor with a second mirror surface pivotally disposed within a housing. A first vibration motor is frictionally coupled to the first rotor. The first rotor is arranged to rotate in at least one direction about a first axis in response to the first vibration motor. A second vibration motor is frictionally coupled to the second rotor. The second rotor is arranged to rotate in at least one direction around the second axis in response to the second vibration motor. A first drive circuit is coupled to the first vibration motor and a second drive circuit is coupled to the second vibration motor. A control device is coupled to the first and second drive circuits. The control device includes a processor coupled to a memory and is configured to execute programmed instructions stored in the memory comprising generating and providing one or more driving signals to first and second vibration motors to drive the first and second rotors to an angular position about the first and second axes. A light source is positioned to emit a beam directed to a center of the first mirror surface, wherein the beam is reflected from the first mirror and contacts a centerline of the second mirror, wherein the second mirror is positioned to reflect the beam to exit the steering device at a pointing direction determined by the angular position of the first and second mirrors.

A method for making a compact wide-angle optical beam steering device includes providing a first rotor with a first mirror surface and a second rotor with a second mirror surface pivotally disposed within a housing. A first vibration motor is frictionally coupled to the first rotor. The first rotor is arranged to rotate in at least one direction about a first axis in response to the first vibration motor. A second vibration motor is frictionally coupled to the second rotor. The second rotor is arranged to rotate in at least one direction around the second axis in response to the second vibration motor. A first drive circuit is coupled to the first vibration motor and a second drive circuit is coupled to the second vibration motor. A control device is coupled to the first and second drive circuits. The control device includes a processor coupled to a memory and is configured to execute programmed instructions stored in the memory comprising generating and providing one or more driving signals to first and second vibration motors to drive the first and second rotors to an angular position about the first and second axes. A light source is provided positioned to emit a beam directed to a center of the first mirror surface, wherein the beam is reflected from the first mirror and contacts a centerline of the second mirror, wherein the second mirror is positioned to reflect the beam to exit the steering device at a pointing direction determined by the angular position of the first and second mirrors.

This technology advantageously produces a highly miniaturized optical beam steering assembly that, when compared to commercial galvanometer scanners, is at least 300 times smaller by volume (<2 cubic centimeters) and provides at least two times the range of motion in a single fully-integrated module. In comparison to MEMS scanners, this technology requires only three (3) volts to operate and enables the creation of very small and efficient drive electronics that are integrated on a single integrated circuit (IC). This technology also advantageously holds the position of the scanning beam without an additional power input.

BRIEF DESCRIPTION OF THE DRAWINGS

FIG. 4A is a front view of a compact wide-angle beam steering assembly showing the electrically connected components illustrated in FIG. 3 folded into a partially assembled housing;

FIG. 4B is cross sectional view A-A of the compact wide-angle beam steering assembly illustrated in FIG. 4A;

FIG. 5B is a cross sectional view B-B of the compact wide-angle beam steering assembly illustrated in FIG. 5A;

DETAILED DESCRIPTION

Figure 1:
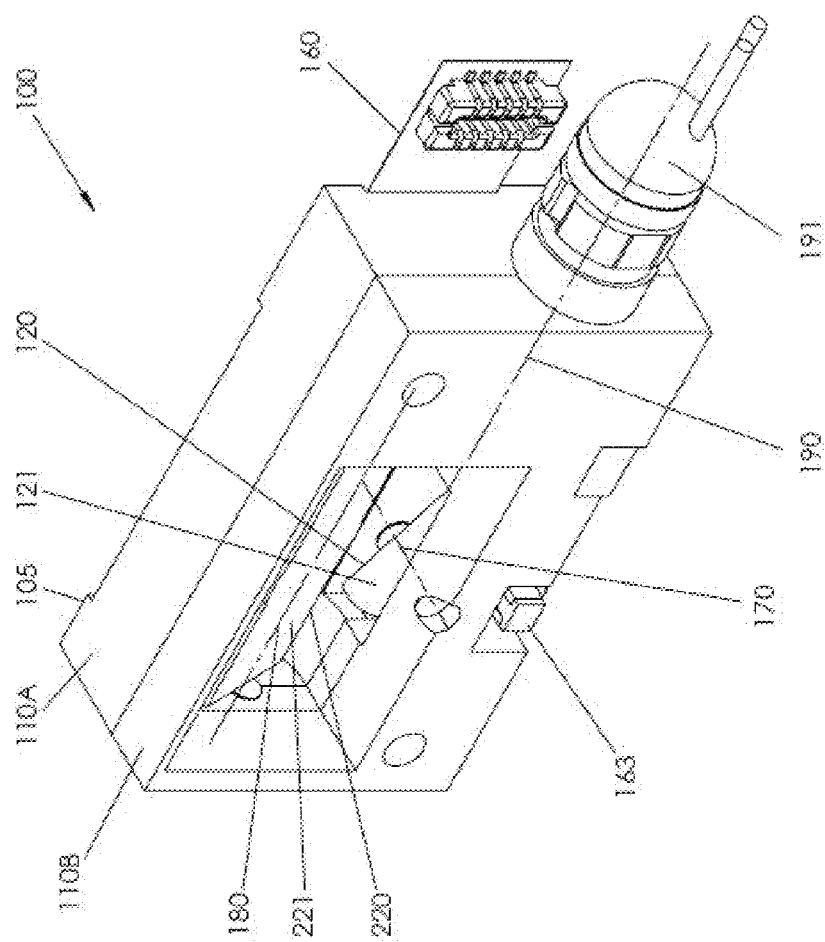
FIG. 1 is a perspective view of an example of a compact wide-angle beam steering apparatus.

An exemplary compact wide-angle optical beam steering assembly is illustrated in FIGS. 1-9. The exemplary compact wide-angle optical beam steering assembly includes a housing 105, a first rotor 120, a second rotor 220, a first radially poled magnet 140, and a second radially poled magnet 240, flexible members 150 and 250, flexible circuit board assembly 160, integrated circuit (IC) drivers 162 and 262, first vibration motor 163 and second vibration motor 263, vibration motor contact pads 164 and 264, position sensors 165 and 265, connector 167, microcontroller 168, and light source 191, although the compact wide-angle beam system 100 could include other types and numbers of assemblies, devices, components and/or other elements in other configurations. This exemplary technology provides a number of advantages including providing more compact and efficient wide-angle beam steering apparatuses and methods.

Figure 2:
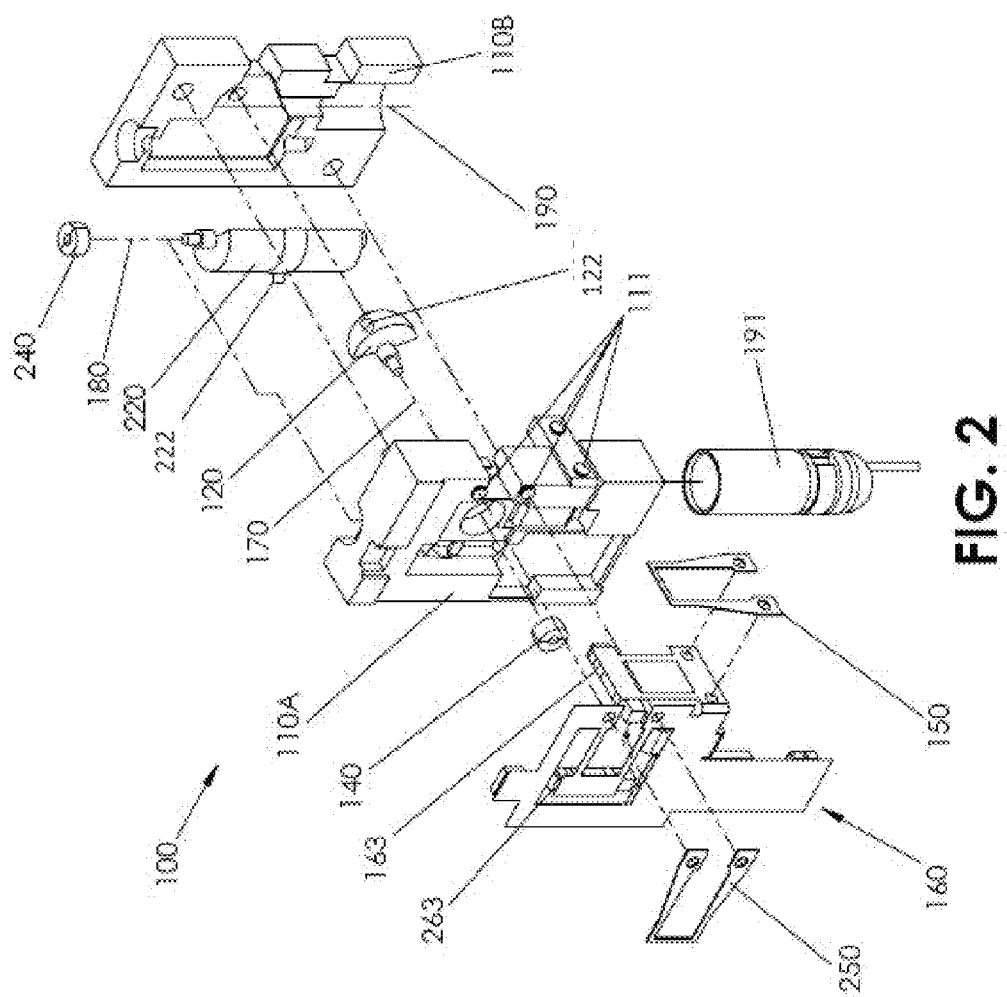
FIG. 2 is an exploded view of the compact wide-angle beam steering apparatus shown in FIG. 1.
Figure 6:
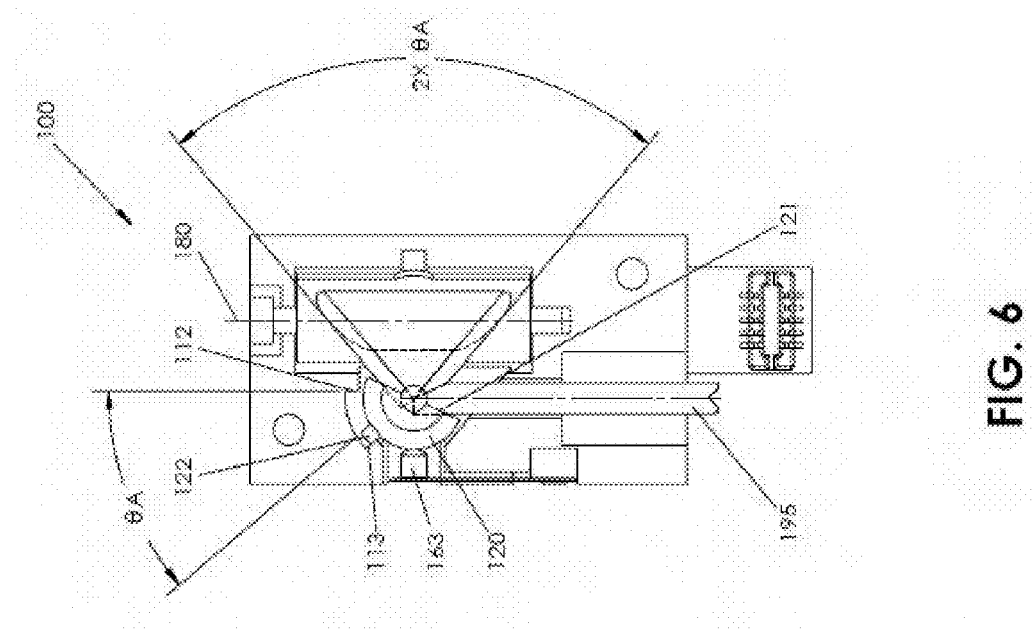
FIG. 6 is a front view of the compact wide-angle beam steering assembly illustrated in FIG. 1, with a partial housing, illustrating the first axis mirror angle $\theta_A$ and the beam angle $2\theta_A$.

Referring more specifically to FIGS. 1-2, housing 105 includes first housing portion 110A and second housing portion 110B which are mated together, although the housing can comprise other numbers and types of one or more portions. The housing 105 is compact with a volume of less than two cubic centimeters, although the housing 105 may have other configurations and other sizes. The first housing portion 110A and the second housing portion 110B are configured to house the first rotor 120 and to define a first axis 170 about which first rotor 120 rotates. The housing 105 includes edges 112 and 113, as shown in FIG. 6, which limit the rotation of first rotor 120 and its protrusion 122 about the first axis 170, although the housing 105 may include other numbers and types of elements to limit the rotation of first rotor 120.

Figure 7:
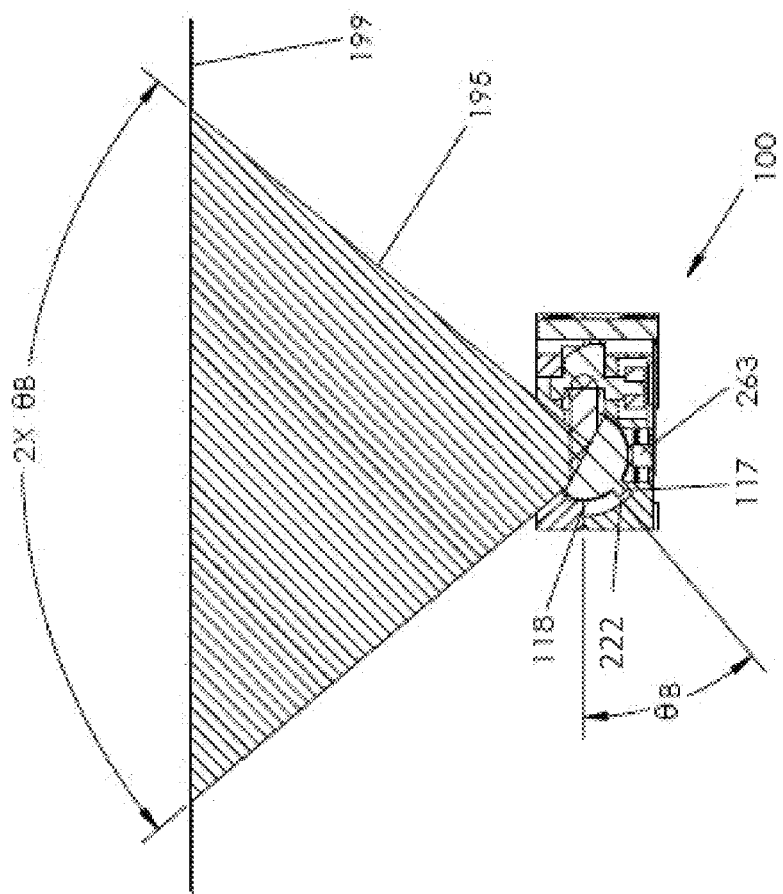
FIG. 7 is a partial section view of the compact wide-angle beam steering assembly illustrated in FIG. 1 showing the second axis mirror angle $\theta_B$ and the beam angle $2\theta_B$.

Referring again to FIGS. 1-2, the first housing portion 110A and the second housing portion 110B are also configured to house the second rotor 220 and to define a second axis 180 substantially orthogonal to first axis 170, about which the second rotor 220 rotates. The housing 105 includes the edges 117 and 118, as shown in FIG. 7, which limit the rotation of second rotor 220 and its protrusion 222 about the second axis 180, although housing 105 may include other numbers and types of elements to limit the rotation of second rotor 220.

Referring now specifically to FIG. 2, the first housing portion 110A includes a plurality of retaining alignment bosses 111 suitable for aligning and securing the flexible members 150 and 250 to the housing 105, which securely mount the flexible circuit board 160 to the housing 105. In this example bosses 111 are made of thermoplastic and may be heat staked after the insertion of members 150 and 250, by pressing on the top of bosses 111 with a hot pin to partially melt and radially expand the boss diameter and form an interference fit between the bosses 111 and the members 150 and 250 to form a permanent attachment, although other devices and methods may be utilized to secure flexible members 150 and 250 to the housing 105. The housing 105 is configured to receive the flexible circuit board 160 around the outer surface of the housing 105, such that the electronic elements supported by the flexible circuit board 160 are positioned to operatively interact with the first rotor 120 and the second rotor 220 as described below and illustrated in FIGS. 4A-5C.

Referring again to FIGS. 1 and 2, the housing 105 receives a light source 191, such that the light source is positioned to be aligned with, and introduces a beam into the housing 105 along a third axis 190 defined by the housing 105, which is substantially orthogonal to the first axis 170 and parallel to the second axis 180. The light source 191 is by way of example, a source of a collimated laser beam, although the housing 105 may receive other numbers and types of light sources.

The first rotor 120 is disposed within the housing 105 along the first axis 170, such that first rotor 120 may pivot about first axis 170. Referring to FIG. 5C, the first rotor 120 has journal bearings 124 and 125 at each end that enable rotor 120 to pivot with reduced friction. The radius of the journal bearings 124 and 125 is significantly smaller than the driving radius of contact 164 on rotor 120. In this example, cylindrical surfaces 114A and 114B are formed in housing 105 around the cylindrical outside of rotor 120 although other pivot bearing methods and devices may be used. Referring back to FIGS. 1 and 2, the first rotor 120 includes a reflective surface 121, which is substantially parallel and coincident to the axis 170. The reflective surface 121 has one or more optical surface properties including, by way of example, flatness and reflectivity, which are configured to satisfy the law of reflection based on one or more optical properties, such as wavelength, frequency, divergence, and power, of the light beam to be utilized by the steering assembly 100.

Referring to FIG. 2, the first rotor 120 includes the protrusion 122 which extends from the side of the first rotor 120 which is opposite the reflective surface 121. As shown in FIG. 6, the protrusion 122 limits the rotation of the first rotor 120 between the edge 112 and the edge 113 in the housing 105, which defines a pivot angle $\theta_A$ for the first rotor 120. Referring back to FIG. 2, the first radially poled magnet 140 is fixed to the first rotor 120 and is mounted concentric with the axis 170, such that the magnetic field direction of the first radially poled cylindrical magnet 140 is substantially aligned to a diameter about the first axis 170. The first radially poled magnet 140 rotates about the first axis 170 along with the first rotor 120.

Referring again to FIGS. 1-2, the second rotor 220 is disposed within the housing 105 along a second axis 180, such that the second rotor 220 may pivot about the second axis 180, which is substantially orthogonal to the first axis 170. Referring to FIG. 5B, the second rotor 220 has journal bearings 133 and 134 at each end that enable rotor 220 to pivot with reduced friction. The radius of the journal bearings 133 and 134 is significantly smaller than the driving radius of contact 264 on rotor 220. In this example cylindrical surfaces 115A and 115B are formed in housing 105 around the cylindrical outside of rotor 220, although other pivot bearing methods and devices may be used. The second rotor 220 includes a reflective surface 221, which is substantially parallel and coincident to the axis 180. The reflective surface 221 has one or more optical surface properties including, by way of example, flatness and reflectivity, which are configured to satisfy the law of reflection based on one or more optical properties, such as wavelength, frequency, divergence, and power, of the light beam to be utilized by the steering assembly.

Referring now to FIG. 2, the second rotor 220 includes the protrusion 222 which extends from the side of the second rotor 220 which is opposite the reflective surface 221. As shown in FIG. 7, protrusion 222 limits the rotation of the second rotor 220 between the edge 117 and the edge 118 in the housing 105, which defines a pivot angle $\theta_B$ for second rotor 220. Referring back to FIG. 2, the second radially poled cylindrical magnet 240 is fixed to the second rotor 220 and is mounted concentric with the second axis 180, such that the magnetic field direction of the second radially poled magnet 240 is substantially aligned to a diameter about the second axis 180. The second radially poled magnet 240 rotates about the second axis 180 along with the second rotor 220.

As shown in FIG. 2, the flexible members or springs 150 and 250 are secured to the housing 105 through the retaining alignment bosses 111 located in the housing 105. The flexible members 150 and 250 secure the flexible circuit board 160 to the housing 105. The flexible members 150 and 250 are preformed to have a particular angular positioning when attached to alignment bosses 111 as shown in FIGS. 4A and 4B. The flexible members 150 and 250 provide a normal force to the first rotor 120 at its outside cylindrical surface 130 and the second rotor 220 at its outside cylindrical surface 230, respectively, when assembled on housing 105 as shown in FIGS. 5A-5C.

Referring again to FIG. 2, flexible circuit board 160 disposed on the outside of the surface of housing 105. The flexible circuit board 160 is wrapped around the outer surface of the housing 105 to operatively connect the elements supported by the flexible circuit board 160 to the first rotor 120 and the second rotor 220 as shown in FIGS. 4A-5C.

Figure 3:
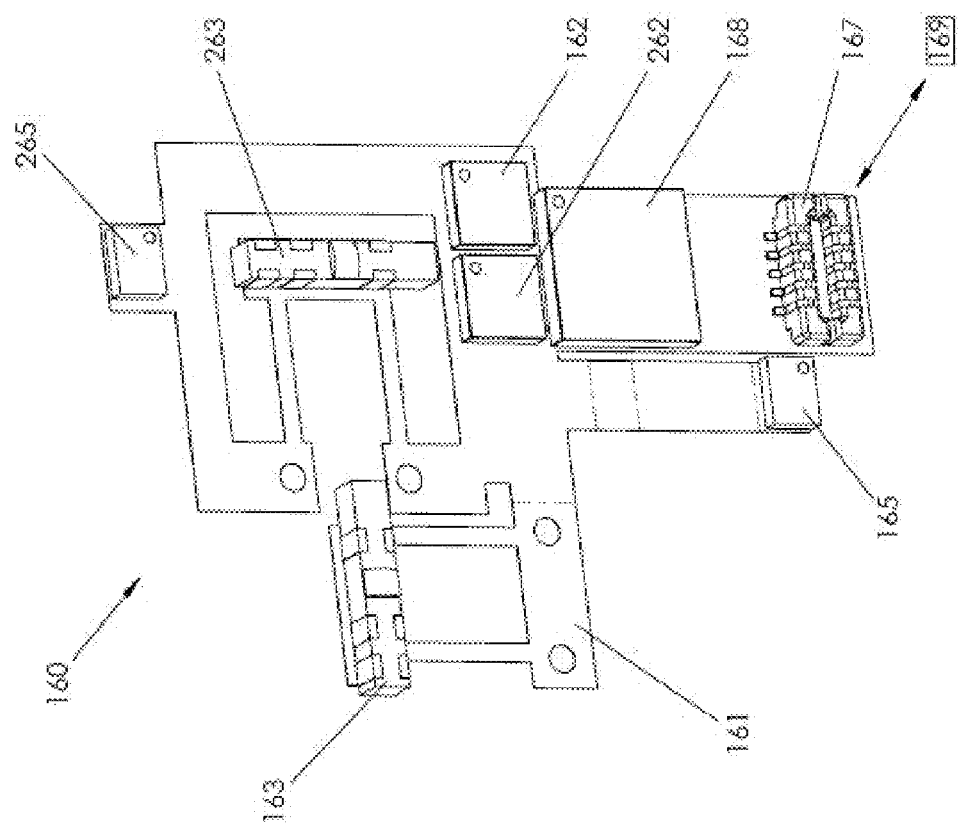
FIG. 3 is a partial perspective view and partial block diagram of the flexible circuit board assembly shown in FIG. 2 of the compact wide-angle beam steering apparatus illustrated in FIG. 1.

Referring to FIG. 3, the flexible circuit board 160 is an unfolded state is illustrated. The flexible circuit board 160 includes the internal electrical connections 161, which provide electrical connections for both power and communication with the various elements supported on the flexible circuit board 160, including the integrated circuit (IC) drivers 162 and 262, the first vibration motor 163 and the second vibration motor 263, the position sensors 165 and 265, the connector 167, and the microcontroller 168, although flexible circuit board 160 may electrically connect and support other types and numbers of systems, devices, components and/or other elements. A variety of suitable printed circuit boards are disclosed by way of example in U.S. Pat. No. 7,309,943, which is incorporated by reference in its entirety, although the flexible circuit board could include other types and numbers of elements configured to execute other types and numbers of functions.

Figure 5A:
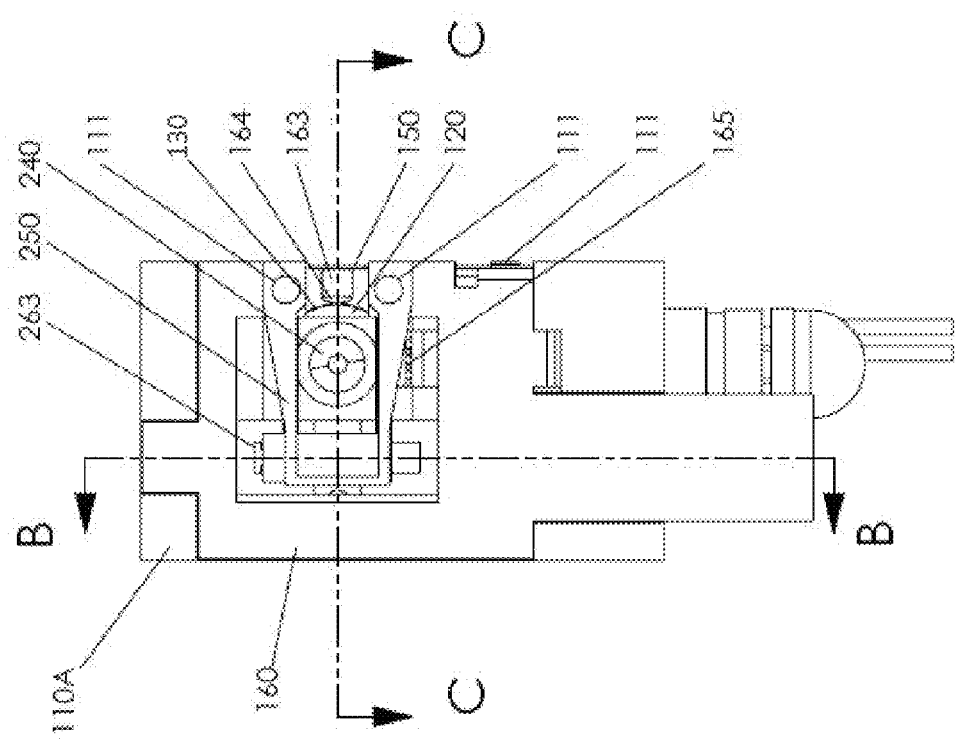
FIG. 5A is a rear view of the compact wide-angle beam steering assembly illustrated in FIG. 1.
Figure 5C:
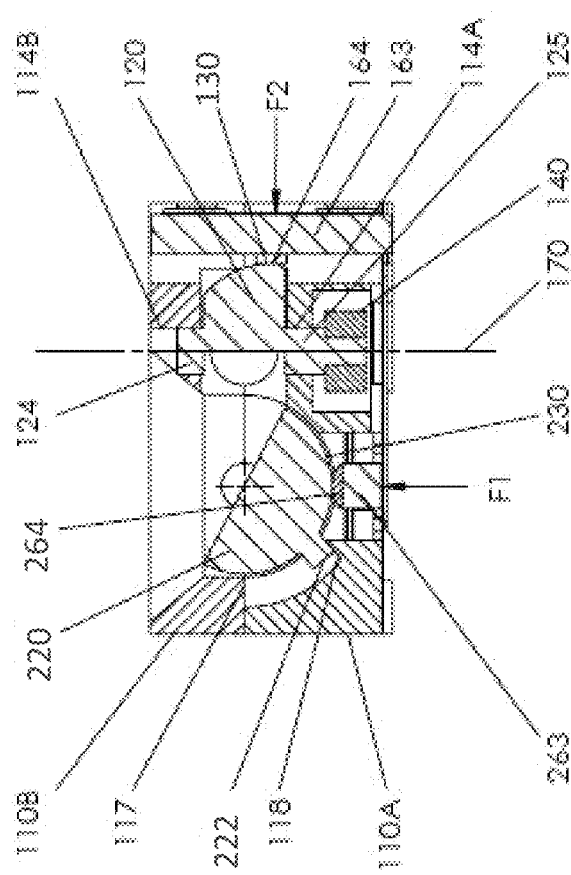
FIG. 5C is a cross sectional view C-C of the compact wide-angle beam steering assembly illustrated in FIG. 5A.

Referring now to FIGS. 5A-5C, elements of the flexible circuit board 160, which is wrapped around the housing 105, in operative connection with the first rotor 120 and the second rotor 220, the first vibration motor 163 is frictionally coupled to first rotor 120 through the vibration contact member 164 is illustrated, although the first vibration motor 163 may be coupled to the first rotor 120 through other types and numbers of elements. The first vibration motor 163 is capable of generating a tangential force on an outside diameter surface of the first rotor 120 that results in rotation of the first rotor 120 about the axis 170. The first vibration motor 163 is held in pre-loaded frictional contact with the first rotor 120 through the flexible member 150 which is secured to the housing 105 as described above, although other elements, such as springs, may be utilized to provide a pre-load frictional contact. As illustrated in FIG. 4A, which illustrates flexible circuit board 160 attached to a partial assembly of housing 105 without first rotor 120 installed, flexible member 150 is pre-formed to create a pre-determined angular deflection $\phi_A$ between housing axis 175 and motor axis 176. When first rotor 120 is assembled within housing 105, a normal force F2 is generated between first rotor 120 and vibration motor contact pad 164 through the deflection of the flexible member 150, with axis 175 and the axis 176 becoming substantially parallel and normal to axis 170 as shown in FIG. 5C.

Referring again to FIGS. 5A-5C, the second vibration motor 263 is frictionally coupled to the second rotor 220 through the vibration contact member 264, although the second vibration motor 263 may be coupled to the second rotor 220 through other elements. The second vibration motor 263 is capable of generating a tangential force on the second rotor 220 that results in rotation around the axis 180. The second vibration motor 263 is held in pre-loaded frictional contact with the second rotor 220 through the flexible member 250 which is secured to housing 105 as described above. Referring to FIG. 4B, which illustrates the flexible circuit board 160 attached to a partial assembly of the housing 105 without the second rotor 220 installed, the flexible member 250 is pre-formed to create a pre-determined angular deflection $\phi_B$ between the housing axis 177 and the motor axis 178. When the second rotor 220 is assembled with the housing 105, a normal force F2 is generated between the second rotor 220 and the vibration motor contact pad 264 through the deflection of the flexible member 250, with the axis 177 and the axis 178 becoming substantially parallel and normal to axis 180 as shown in FIG. 5C. In one example, the first and second vibration motors 163 of 263 are piezoelectric ultrasonic motors model number MLP PB04 which are produced by TDK-EPC (EPCOS Division), although other vibration motors may be utilized. By way of example, the structure and operation of this piezoelectric ultrasonic motor is disclosed in U.S. Pat. No. 7,786,648 B2, which is hereby incorporated by reference in its entirety.

Referring again to FIG. 3, the flexible circuit board 160 connects the first and second vibration motors 163 and 263 to the integrated driver circuits 162 and 262, respectively, which generate the driving signals to drive first and second vibration motors 163 and 263. By way of example, each of the driver circuits 162 and 262 are the NSD2101 circuit produced by AMS®, whose structure and operation are disclosed in U.S. Pat. Nos. 7,786,648, 8,299,733, 8,304,960, and 8,450,905, and U.S. patent application Ser. No. 12/466,929, which are all hereby incorporated by reference in their entirety. The integrated driver circuits 162 and 262 may be coupled to a power source (not shown), such as a DC voltage source. In one example, the power source provides a source of power of approximately three volts to operate the system, although other voltages may be provided.

The flexible circuit board 160 further includes the position sensors 165 and 265, such as model number AS5510 which is produced by AMS®, although other types and numbers of position sensors may be utilized. The positions sensors 165 and 265 are located near and measure the angles of the magnets 140 and 240, respectively, as the magnets 140 and 240 rotate around axes 170 and 180, respectively. In this example, the sensors 165 and 265 measure the changing magnetic field strength which is used to compute the angular position of the first rotor 120 and the second rotor 220 about the axes 170 and 180, respectively, although other methods to determine the angular position may be utilized The flexible circuit board 160 also includes a microcontroller 168, such as model number dsPIC33FJ128MC506-I/PT which is produced by Microchip®, although other microcontrollers may be utilized. The microcontroller 168 is electrically connected to the IC driver circuits 162 and 262, the position sensors 165 and 265 and to the connector 167.

The microcontroller 168 creates a two-axis closed-loop drive and control system that is in bi-directional communication with the IC driver circuits 162 and 262, the position sensors 165 and 265 and an external processor 169. One example of a closed-loop control algorithm that may be utilized by the microcontroller 168 is described in U.S. Pat. No. 8,466,637, which is hereby incorporated by reference in its entirety, although other numbers and types of algorithms may be utilized.

The flexible circuit board assembly 160 also provides the connector 167 for electrical contact and communication with an external controller 169, although other types and numbers of assemblies, devices, components, and elements may be coupled together in other configurations. One example of an external controller is a computer with a USB, SPI or I2C communications port that can send serial commands and receive serial information from microcontroller 168.

The light source 191 provides a light beam for the compact wide-angle beam steering assembly 100. The light source 191 is substantially aligned with the third axis 190, which is substantially orthogonal to the first axis 170 and parallel to the second axis 180. The light source 191 may be, by way of example, collimated diode laser AH650-03-312 which is produced by AixiZ®, although other light sources may be utilized. The third axis 190 is the beam centerline of the light source 191. Although the light source 191 is described, it is to be understood that the light source 191 could also be a sensor.

An exemplary operation of compact wide-angle optical beam steering assembly 100 will now be described with reference to FIGS. 6 through 9. As shown in FIG. 6, a collimated light path or beam 195 is emitted from the light source 191 which is not shown in FIG. 6. The beam 195 is directed to a center of the surface of the mirror 121. The beam 195 is reflected by the mirror 121 the first rotor 120, based on the angular positioning of the first rotor 120 along the first axis 170 and the law of reflection, and is deflected to the mirror 221 on the second rotor 220. At the center of travel of the first rotor 120 the beam 195 is deflected at an angle of substantially 90 degrees. As the first rotor 120 moves through angle range $\theta_A$, the angular movement of beam 195 is two times $\theta_A$ in accordance with the laws of reflection. For example, a rotor angle change of 20 degrees results in a beam angle change of 40 degrees.

As shown in FIGS. 2, 6, and 7, the beam 195 continues its path and contacts a centerline of the reflective mirror 221. The beam 195 is reflected from the mirror 221 on the second rotor 220, based on the angular positioning of the second rotor 220 along the second axis 180 and the law of reflection. At the center of travel of the second rotor 220, the beam 195 is deflected substantially 90 degrees. As the rotor 220 moves through angle range $\theta_B$, the angular movement of beam 195 is two times $\theta_B$. The beam 195 then exits the housing 105 in a steering direction based on the angular positions of the first rotor 120 and the second rotor 220.

Figure 8:
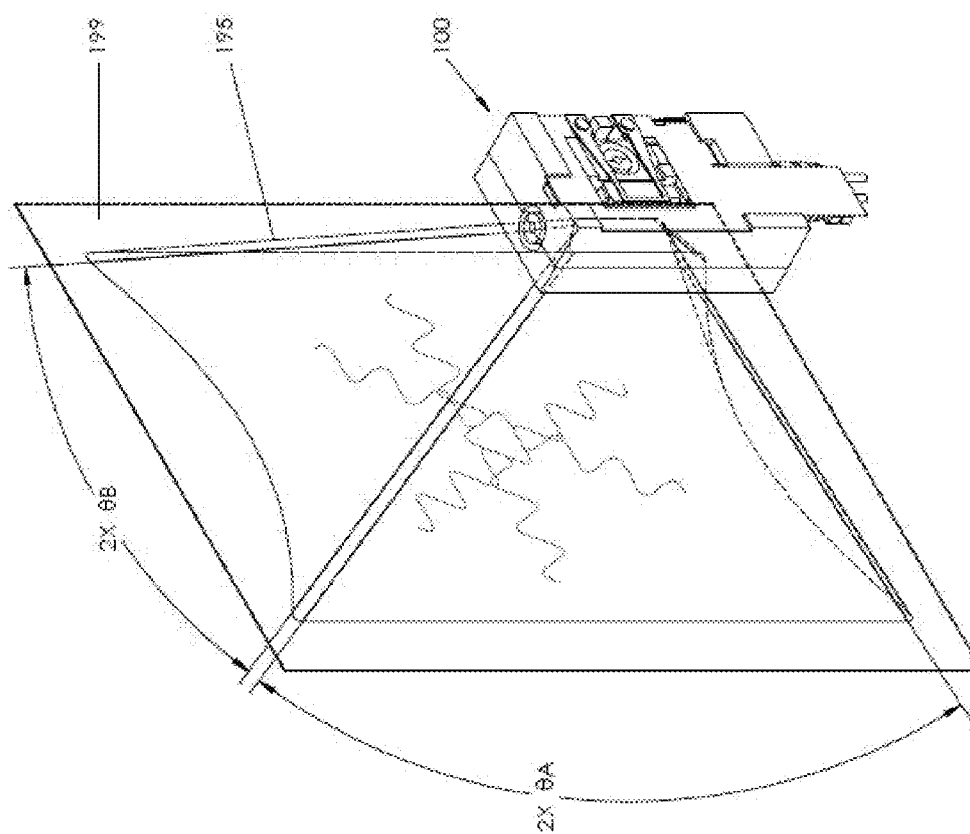
FIG. 8 is a partial section view of the compact wide-angle beam steering assembly, illustrated in FIG. 1, showing the two-axis beam projection envelope.

Referring to FIG. 8, the combined beam steering range of the compact wide-angle optical beam steering assembly 100 is illustrated. Light beam 195 is steered through the range two times $\theta_A$ and two times $\theta_B$ and the projection of range of motion of beam 195 is shown on a flat plane 199.

Figure 9:
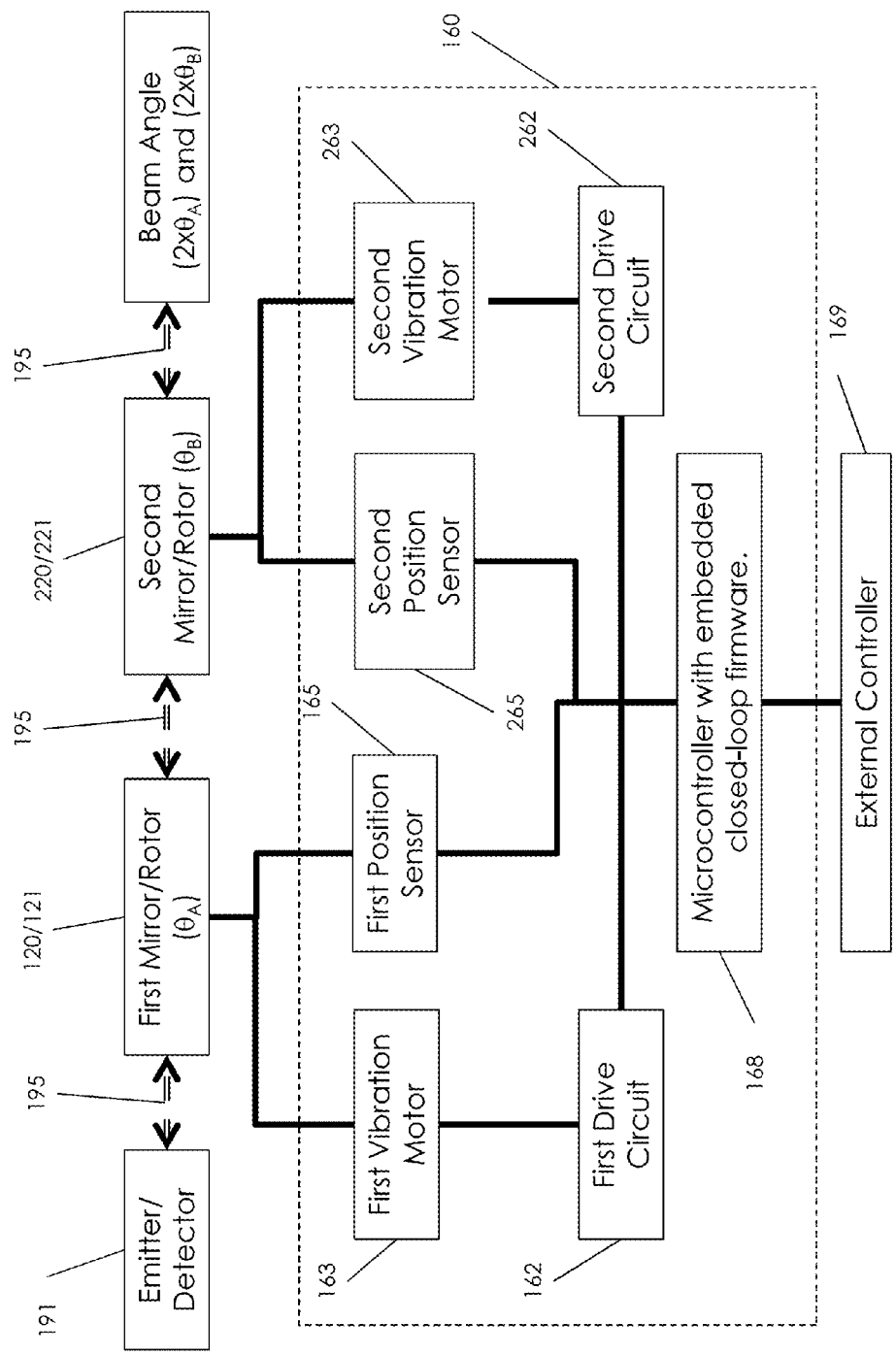
FIG. 9 is a block diagram illustrating the control system of the compact wide-angle beam steering assembly illustrated in FIG. 1.

A system block diagram of the compact wide-angle optical beam steering assembly 100 is illustrated in FIG. 9. The flexible circuit board assembly 160 integrates all components inside the dashed line. The microcontroller 160 with embedded closed-loop firmware 168 is operably connected to the drive circuits 162 and 262 and the position sensors 165 and 265 and with the external controller 169. The microcontroller 160 creates a two-axis closed-loop drive and control system that is in bi-directional communication with the IC driver circuits 162 and 262, the position sensors 165 and 265 and an external processor 169. One example of a closed-loop control algorithm that may be utilized by microcontroller 168 is described in U.S. Pat. No. 8,466,637, which is hereby incorporated by reference in its entirety, although other numbers and types of algorithms may be utilized.

The drive circuits 162 and 262 generate and provide drive signals to vibrate the first vibration motor 163 and the second vibration motor 263. The operation of the drive circuits 162 and 262 is illustrated and described in, by way of example, U.S. Pat. Nos. 7,786,648, 8,299,733, 8,304,960, and 8,450,905, and U.S. patent application Ser. No. 12/466,929, which are hereby incorporated by reference in their entirety. The vibrations of the first vibration motor 163 and the second vibration motor 263 are capable of generating a tangential force on an outside diameter surface of the first rotor 120 and the second rotor 220 that results in rotation of the rotors. Specifically, the vibration of the vibration motors 163 and 263 causes the first rotor 120 and the second rotor 220 to change their angular positions about the first axis 170 and second axis 180, respectively. The rotation of the mirrors 121 and 221 changes the steering direction of the light beam 195 as it travels through housing 105.

The positions sensors 165 and 265 measure the angles of the magnets 140 and 240, respectively, as the magnets 140 and 240 rotate in unison with the first rotor 120 and the second rotor 220 around the axes 170 and 180, respectively. The position sensors 165 and 265 measure the changing magnetic field strength, which is used to compute the angular position of the first rotor 120 and the second rotor 220 about the axes 170 and 180, respectively, although other methods to determine the angular position may be utilized. The microcontroller 168 may then change the angular positions of the rotors 120 and 220 based on the determined position in a closed-feedback loop.

Accordingly, the technology as illustrated and described with the examples herein provides more a more compact and efficient wide-angle beam steering assembly. With this technology, the beam steering assembly provides at least two times the range of motion in a single fully-integrated module, while requiring only minimal power to operate. Additionally, this technology enables the creation of very small, low voltage, and efficient drive electronics that are integrated on a single integrated circuit (IC). This technology also advantageously holds the position of the scanning beam without an additional power input.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Accordingly, the technology is limited only by the following claims and equivalents thereto.

What is claimed is:

1. A compact wide-angle optical beam steering device comprising:
   a first rotor with a first mirror surface and a second rotor with a second mirror surface pivotally disposed within a housing;
   a first vibration motor frictionally coupled to the first rotor, the first rotor arranged to rotate in at least one direction about a first axis in response to the first vibration motor;

a second vibration motor frictionally coupled to the second rotor, the second rotor arranged to rotate in at least one direction around a second axis in response to the second vibration motor;

a first drive circuit coupled to first vibration motor and a second drive circuit coupled to second vibration motor;

a control device coupled to first and second drive circuits, the control device comprising a processor coupled to a memory and configured to execute programmed instructions stored in the memory comprising:
generating and providing one or more driving signals to first and second vibration motors to drive the first and second rotors to an angular position about the first and second axes; and a light source positioned to emit a beam directed to a center of the first mirror surface, wherein the beam is reflected from the first mirror and contacts a centerline of the second mirror, wherein the second mirror is positioned to reflect the beam to exit the steering device at a pointing direction determined by the angular position of the first and second mirrors, wherein the angular position of the first and second mirrors causes the beam to exit the steering device with the pointing direction substantially orthogonal to the first axis and parallel to the second axis and the beam is reflected from the first mirror at substantially 90 degrees when the first mirror surface is rotated to substantially its center-of-travel and the beam is reflected from the second mirror at substantially 90 degrees when the second mirror surface is rotated to substantially its center-of-travel.

2. The device as set forth in claim 1 wherein the first mirror surface is substantially parallel and coincident with the first axis.

3. The device as set forth in claim 1 wherein the second mirror surface is substantially parallel and coincident with the second axis.

4. The device as set forth in claim 1 wherein the first axis is substantially orthogonal to the second axis.

5. The device as set forth in claim 1 wherein the first vibration motor generates a tangential force at a first drive contact radius on the first rotor to generate rotation about the first axis and the second vibration motor generates a tangential force at a second drive contact radius on the second rotor to generate rotation around the second axis.

6. The device as set forth in claim 5 wherein the tangential force generated at the first drive contact radius is a contact frictional force generated by strain of a first spring where the first spring force direction substantially intersects the first axis and tangential force generated at the second drive contact radius is a contact frictional force generated by the strain of a second spring where the second spring force direction substantially intersects the second axis.

7. The device as set forth in claim 1 where the first and second drive circuits and controller are integrated on a single flexible printed circuit board.

8. The device as set forth in claim 7 wherein the flexible printed circuit board provides connections to the first and second vibration motors and connections to an external controller and is folded and assembled into the housing.

9. The device as set forth in claim 1 wherein at least one of the first rotor or second rotor has one or more features that interfere with the housing and mechanically limit a range of rotation of the first or second rotor about the first axis or second axis.

10. The device as set forth in claim 1 further comprising:
a first position sensor coupled to first rotor and a second position sensor coupled to second rotor wherein first and second positions sensors measure the angular position of first and second rotors about the first axis or the second axis.

11. The device as set forth in claim 10 further comprising:
a first rotating magnet mounted to the first rotor and a second rotating magnet mounted to the second rotor;
a first magnetic sensor coupled to the first rotating magnet and a second magnetic sensor coupled to the second rotating magnet, wherein the first and second magnetic sensors measure a changing magnetic field strength based on a position of the first and second rotating magnets, and calculate a corresponding angular position of the first and second rotors about the first axis or the second axis.

12. A method for making a compact wide-angle optical beam steering device comprising:
providing a first rotor with a first mirror surface and a second rotor with a second mirror surface pivotally disposed within a housing;
frictionally coupling a first vibration motor to the first rotor, the first rotor arranged to rotate in at least one direction about a first axis in response to the first vibration motor;
frictionally coupling a second vibration motor to the second rotor, the second rotor arranged to rotate in at least one direction around a second axis in response to the second vibration motor;
coupling a first drive circuit to first vibration motor and a second drive circuit coupled to second vibration motor;
coupling a control device to first and second drive circuits, the control device comprising a processor coupled to a memory and configured to execute programmed instructions stored in the memory comprising:
generating and providing one or more driving signals to first and second vibration motors to drive the first and second rotors to an angular position about the first and second axes; and
providing a light source positioned to emit a beam directed to a center of the first mirror surface, wherein the beam is reflected from the first mirror and contacts a centerline of the second mirror, wherein the second mirror is positioned to reflect the beam to exit the steering device at a pointing direction determined by the angular position of the first and second mirrors, wherein the angular position of the first and second mirrors causes the beam to exit the steering device with the pointing direction substantially orthogonal to the first axis and parallel to the second axis and the beam is reflected from the first mirror at substantially 90 degrees when the first mirror surface is rotated to substantially its center-of-travel and the beam is reflected from the second mirror at substantially 90 degrees when the second mirror surface is rotated to substantially its center-of-travel.

13. The method as set forth in claim 12 wherein the first mirror surface is substantially parallel and coincident with the first axis.

14. The method as set forth in claim 12 wherein the second mirror surface is substantially parallel and coincident with the second axis.

15. The method as set forth in claim 12 wherein the first axis is substantially orthogonal to the second axis.

16. The method as set forth in claim 12 wherein the first vibration motor generates a tangential force at a first drive contact radius on the first rotor to generate rotation about the first axis and the second vibration motor generates a tangential force at a second drive contact radius on the second rotor to generate rotation around the second axis.

17. The method as set forth in claim 16 wherein the tangential force generated at the first drive contact radius is a contact frictional force generated by strain of a first spring where the first spring force direction substantially intersects the first axis and tangential force generated at the second drive contact radius is a contact frictional force generated by the strain of a second spring where the second spring force direction substantially intersects the second axis.

18. The method as set forth in claim 1 where the first and second drive circuits and controller are integrated on a single flexible printed circuit board.

19. The method as set forth in claim 18 wherein the flexible printed circuit board provides connections to the first and second vibration motors and connections to an external controller and is folded and assembled into the housing.

20. The method as set forth in claim 12 wherein at least one of the first rotor or second rotor has one or more features that interfere with the housing and mechanically limit a range of rotation of the first or second rotor about the first axis or second axis.

21. The method as set forth in claim 12 further comprising:
providing a first position sensor coupled to first rotor and a second position sensor coupled to second rotor wherein first and second positions sensors measure the angular position of first and second rotors about the first axis or the second axis.

22. The method as set forth in claim 21 further comprising:
providing a first rotating magnet mounted to the first rotor and a second rotating magnet mounted to the second rotor;
providing a first magnetic sensor coupled to the first rotating magnet and a second magnetic sensor coupled to the second rotating magnet, wherein the first and second magnetic sensors measure a changing magnetic field strength based on a position of the first and second rotating magnets, and calculate a corresponding angular position of the first and second rotors about the first axis or the second axis.

* * * * *